United States Patent [19]

Buxton et al.

[11] Patent Number: 4,728,757
[45] Date of Patent: Mar. 1, 1988

[54] INTERLOCK SCHEME FOR DRAWOUT HIGH AMPERAGE MULTI-POLE CIRCUIT BREAKER

[75] Inventors: Clifford A. Buxton; David C. Higgins, both of Cedar Rapids; Gary A. Volesky, Newhall, all of Iowa

[73] Assignee: Square D Company, Palatine, Ill.

[21] Appl. No.: 697,355

[22] Filed: Feb. 1, 1985

[51] Int. Cl.$^4$ .............................................. H01H 9/20
[52] U.S. Cl. .............................................. 200/50 AA
[58] Field of Search .................. 200/50 A, 50 AA; 361/337, 339, 343-345; 335/164, 160

[56] References Cited

U.S. PATENT DOCUMENTS 4,002,865  1/1977  Kuhn et al. ..................... 200/50 AA
4,206,329  6/1980  Jarosz ............................ 200/50 AA Primary Examiner—J. R. Scott
Attorney, Agent, or Firm—Larry I. Golden; Richard T. Guttman

[57] ABSTRACT

An interlock scheme is provided for preventing access to a draw-out mechanism of a drawout circuit breaker which is in a contact "closed" position and preventing the contacts from being closed when the circuit breaker is only partially connected to the power bus. A sliding door, carried by the front cover of the circuit breaker, is movable between a first position providing access to a driver shaft assembly for operation of the drawout mechanism and a second position preventing access to the driver shaft assembly. A plunger and slider assembly is operable associated with the access door to prevent the door from being moved from the second position to the first position unless the contacts within the circuit breaker are open. A trip arm prevents the contacts from being closed when the circuit breaker is only partially connected to the power bus.

5 Claims, 10 Drawing Figures

4,728,757

INTERLOCK SCHEME FOR DRAWOUT HIGH AMPERAGE MULTI-POLE CIRCUIT BREAKER

FIELD OF THE INVENTION

The present invention relates in general to circuit interrupting apparatus of the drawout type and more particularly to an improved and economical scheme for preventing access to the drawout mechanism while the circuit breaker is closed and preventing the circuit breaker from being closed while it may be only partially connected to the power bus, while also preventing damage to the drawout mechanism in the event excessive torque is applied to operate the drawout mechanism.

BACKGROUND OF THE INVENTION

High amperage molded case drawout circuit breakers include some type of drawout mechanism which is ordinarily operated by a rachet mechanism or a driver shaft. It is important that the circuit breaker should not be removed from its connected position while the circuit breaker is closed, and there are accordingly numerous methods for requiring that the circuit breaker be in the open position prior to removal of the circuit breaker from its connected position. The various designs of the drawout mechanisms and casings may lend themselves to various means for preventing removal of the circuit breaker while the circuit breaker is in a connected position and "ON" and also for preventing the circuit breaker from being closed and also avoiding damage to the drawout mechanism which may be caused by excessive torque exerted upon the operating mechanism during insertion or withdrawal of the circuit breaker.

SUMMARY OF THE INVENTION

The present invention is for use in a drawout version of a circuit breaker of the type shown and described in application Ser. No. 493,111 filed May 9, 1983 now U.S. Pat. No. No. 4,506,246 by T. M. Wong for an Improved Interlock Scheme For High Amperage Molded Case Circuit Breaker which is assigned to the same assignee as the instant invention and the disclosure of which is hereby incorporated by reference.

The present invention incorporates a circuit breaker of the type described in the aforereferenced application which is additionally provided with a drawout mechanism that includes a worm gear carried on a driven shaft which extends between a pair of opposite side plates carried on the exterior sides of the molded case circuit breaker. The worm gear is operated by a worm which is controlled by a driver shaft assembly that is accessible for operation through a drawout access window carried by the circuit breaker casing. Operation of the worm gear rotates the driven shaft and causes a drive-arm assembly on each side of the circuit breaker to move the circuit breaker in either an inward direction toward a "connected" position or in an outward direction toward a "removed" position within a switchboard compartment.

Intermediate the "connected" position and the "removed" position is a "test" position at which point operation of the circuit breaker may be tested. If the operator stops operating the drawout mechanism while the circuit breaker is between the test and the connected position, the circuit breaker will be held tripped by a trip assembly coupled to a cam attached to the worm gear. The purpose of this interlock is to prevent energizing the circuit breaker with only a partial connection of the circuit breaker terminal with the power bus.

A plunger assembly which is operated by a plunger actuator that is carried by the blade carrier controls a slider that is operably associated with the access door for preventing movement of the access door from a closed position to an open position when the circuit breaker contacts are closed.

Furthermore, a driver shaft assembly which operates the worm and associated worm gear is provided with a slip clutch feature to prevent overtorquing of the drawout mechanism.

Other features of the invention will be apparent to those skilled in the art from the following specification including the appended claims and the accompanying drawings of the invention in which:

DESCRIPTION OF THE PREFERRED EMBODIMENT

Figure 1:
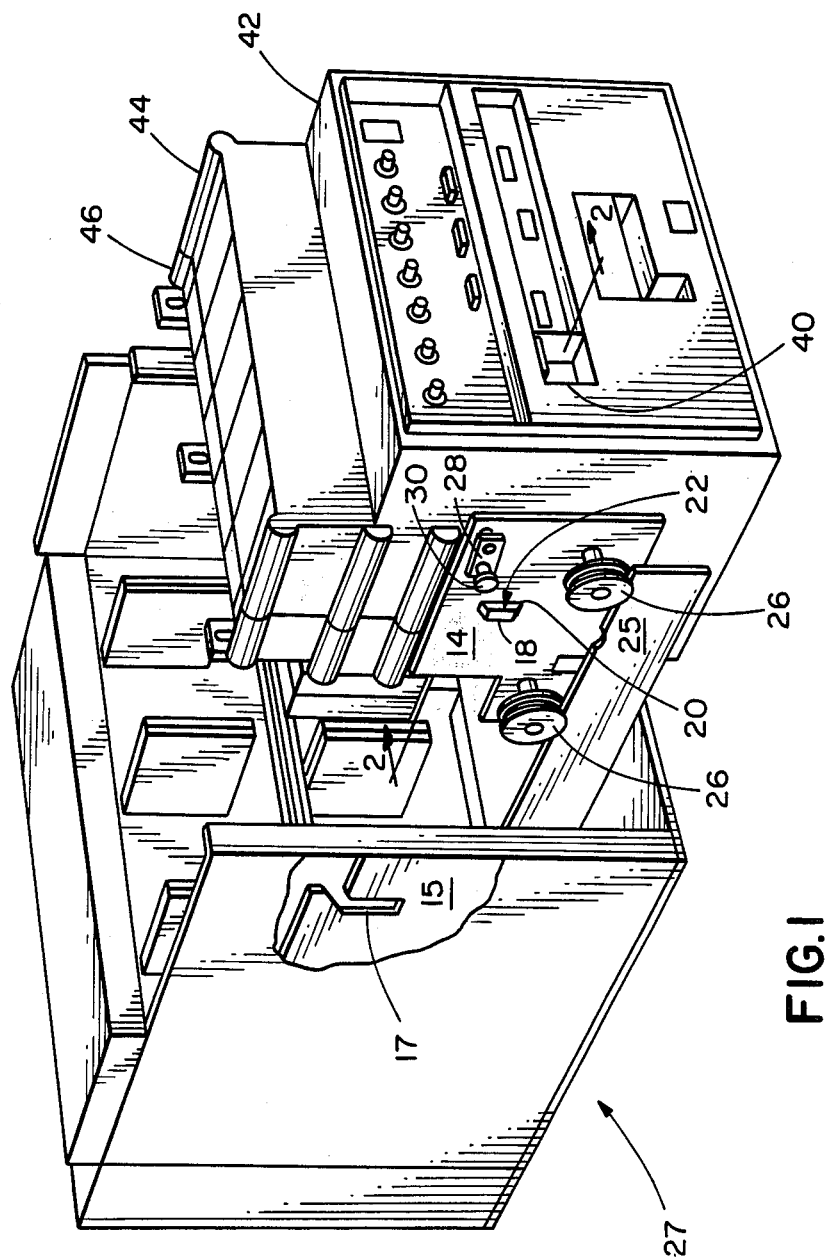
FIG. 1 is a perspective view showing the draw-out molded case circuit breaker which incorporates the interlock features of the present invention.
Figure 4:
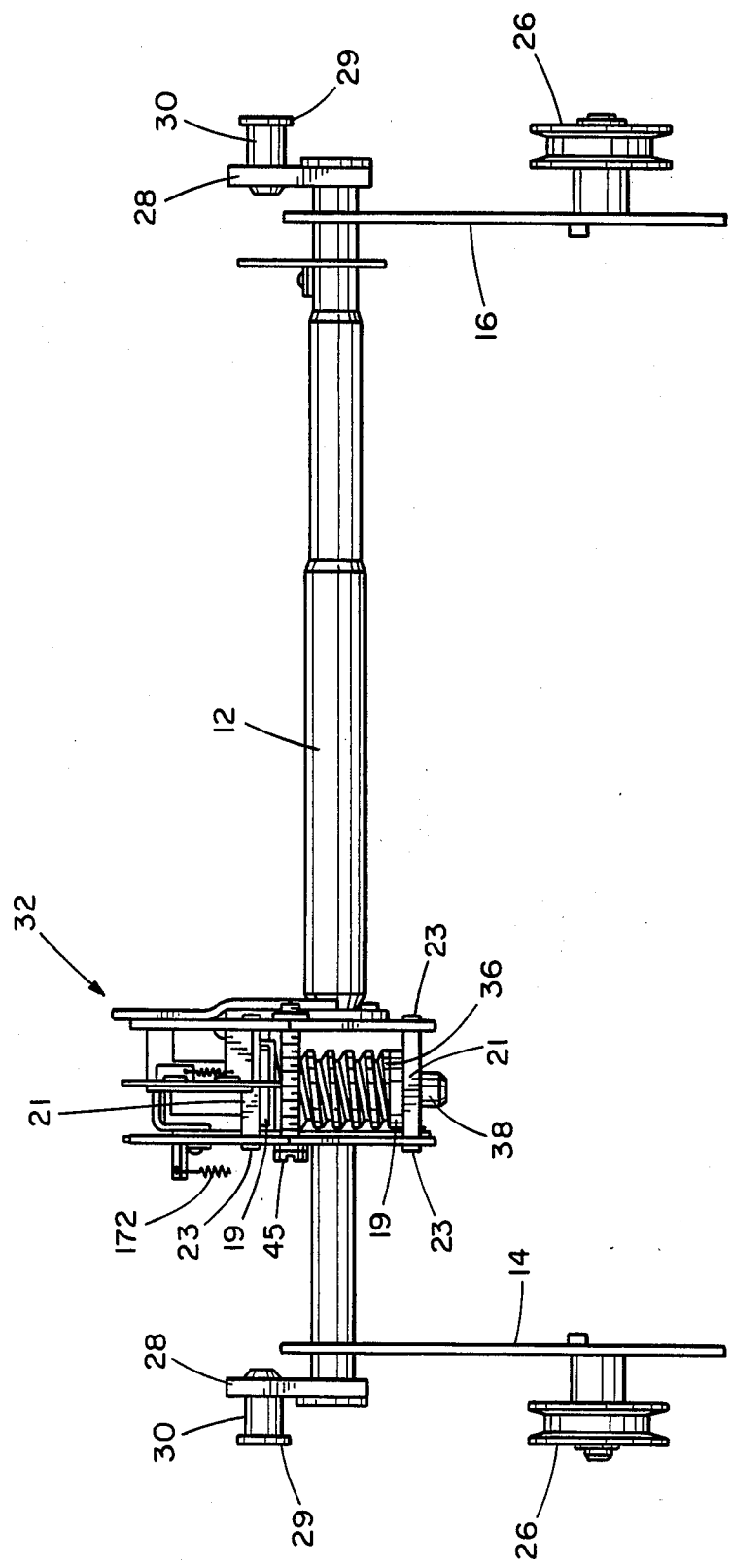
FIG. 4 is a front view of the draw-out assembly incorporating principles of the present invention showing the worm and gear assembly rotated 90° forward.
Figure 5:
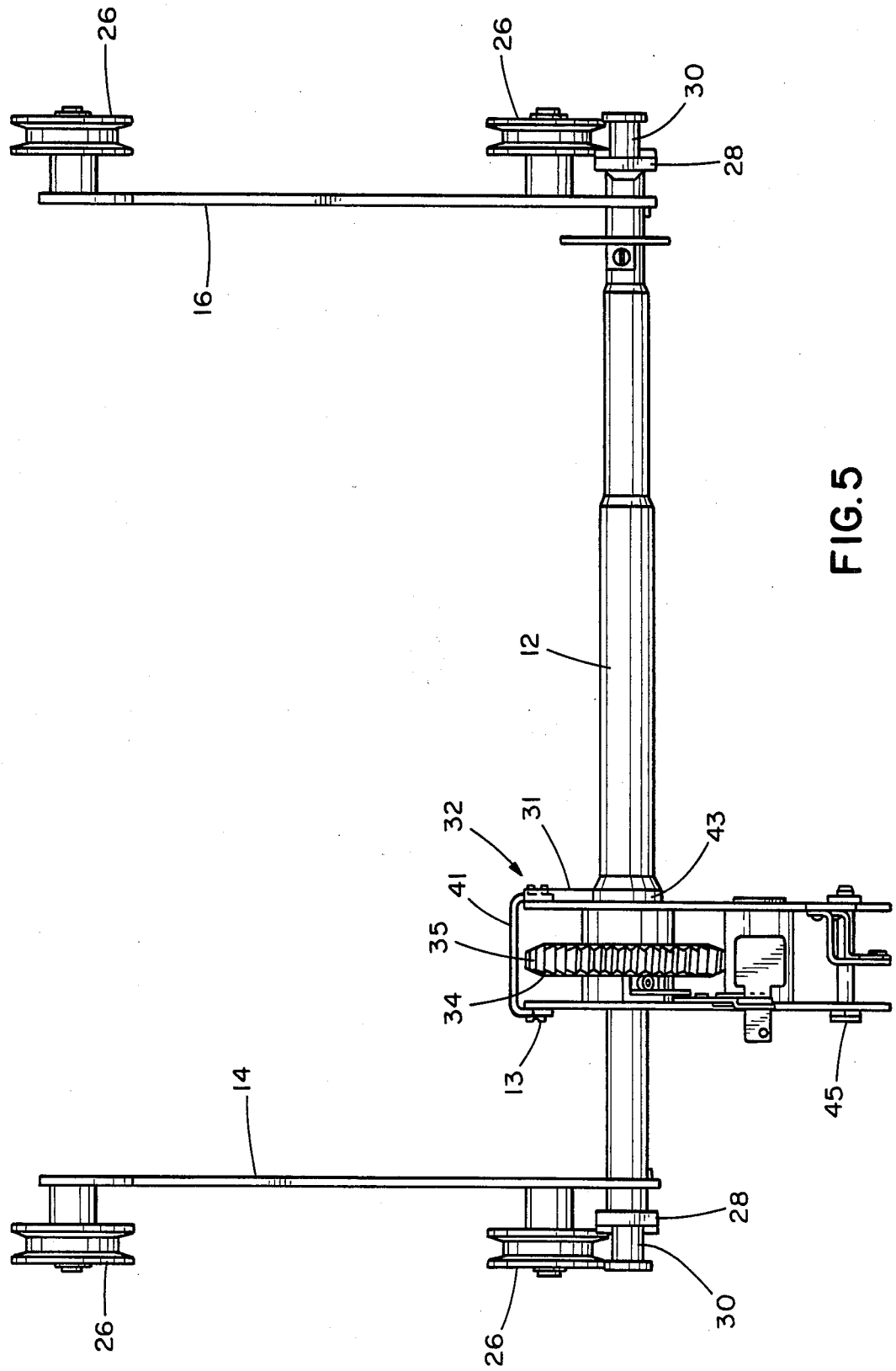
FIG. 5 is a top view of the draw-out assembly incorporating principles of the present invention showing the worm gear assembly rotated 90° forward.

As shown in FIGS. 1, 4 and 5 of the Drawings, the drawout mechanism includes a driven shaft 12 which is carried by a left side plate 14 and a right side plate 16 that are secured to the exterior of the molded casing of the circuit breaker. The circuit breaker includes a first contact 5, a second contact 7 and a movable contact carrier 9 which carries the second contact and is movable between a first position in which said contacts are separated or "open" and a second position in which said contacts are engaged or "closed". Embossed segments 18 of the circuit breaker casing extend through openings 20 which are provided in each of the side plates. A pin 22 extends through an aperture in segment 18 in generally parallel relationship with the side plates and retains the side plate against the side of the circuit breaker. A pair of rollers 26 are provided which extend outward from the side of each side plate and run on a track 25 provided in a switchboard compartment 27 for drawout insertion and removal of the circuit breaker. A drawout arm 28 is connected at each end of the driven shaft 12 with a drive knob 30 extending from the free end of each drawout arm. The knob 30 includes an outer lip portion 29. The knob is received within a slot 17 formed in a support plate 15 secured on each side within the switchboard compartment.

A drawout brace assembly 32 houses and supports a worm gear 34 that includes a hub 33 and circumferential teeth 35 along with an associated worm 36, the rotation of which controls rotation of the worm gear and the resultant movement of the drive knob to draw the circuit breaker in or out of the compartment 27.

The brace assembly includes a left brace plate 37 and a right brace plate 39 connected by a top brace 41 by screws 13 or some other fastening means. The worm gear 34 is connected to the driven shaft 12 by a key 47 and set screw 49, with the driver shaft 12 extending through an opening 11 in each of the brace plates 37 and 39. A stop lever 43 is welded to the driven shaft 12 and operatively associated with stop block 31 which is connected to the right brace plate 39 by, for example, a projection weld. The worm 36 is supported between a pair of steel supports 21 which each have a pair of ears 23 respectively received by the left brace plate 37 and the right brace plate 39. A nylon bushing 19 spaces the grooves of the worm from each of the supports 21.

Figure 6:
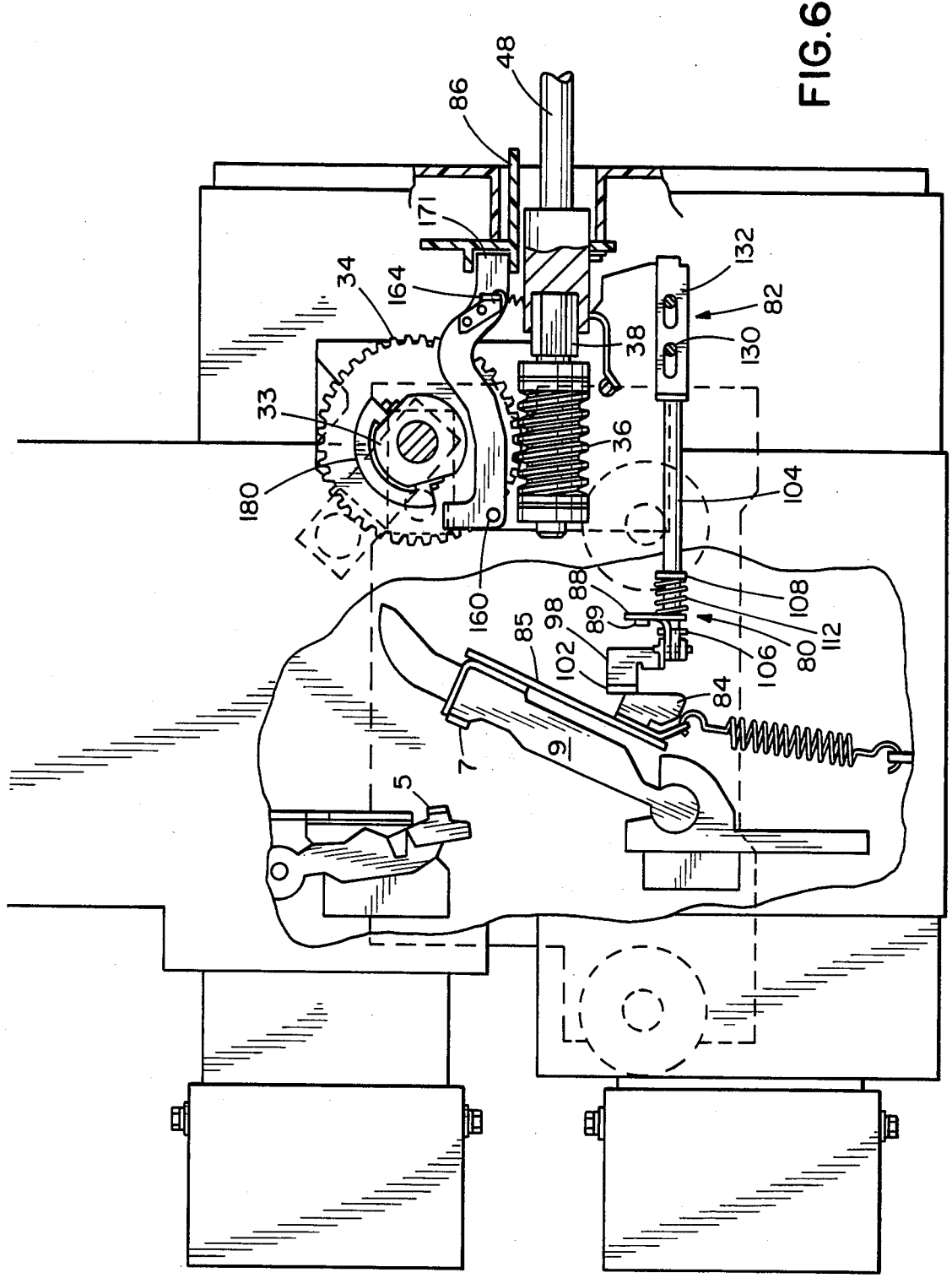
FIG. 6 is a side view as shown in FIG. 2 with the contact blades in the open position and access door opened.

The worm gear is controlled by a driver shaft assembly 38 that is recessed behind an access opening 40 provided in the axuiliary cover 42 of the circuit breaker. The auxiliary or front cover is connected to the cover 44 of the circuit breaker which in turn is connected to the base 46 as shown in FIG. 1 of the Drawings. The base, cover and auxiliary cover constitute a circuit breaker casing. An operator inserts a crank 48 through the opening 40 to operate the drive shaft assembly when connecting or removing the circuit breaker as seen in FIG. 6. The brace assembly is mounted to a generally U-shaped molded portion 53 of the cover 44 by a screw 45. The molded portion 53 includes spaced apart forward legs 55 having holes 57 through which screw 45 passes and a rearward solid portion with opening 59.

Figure 9:
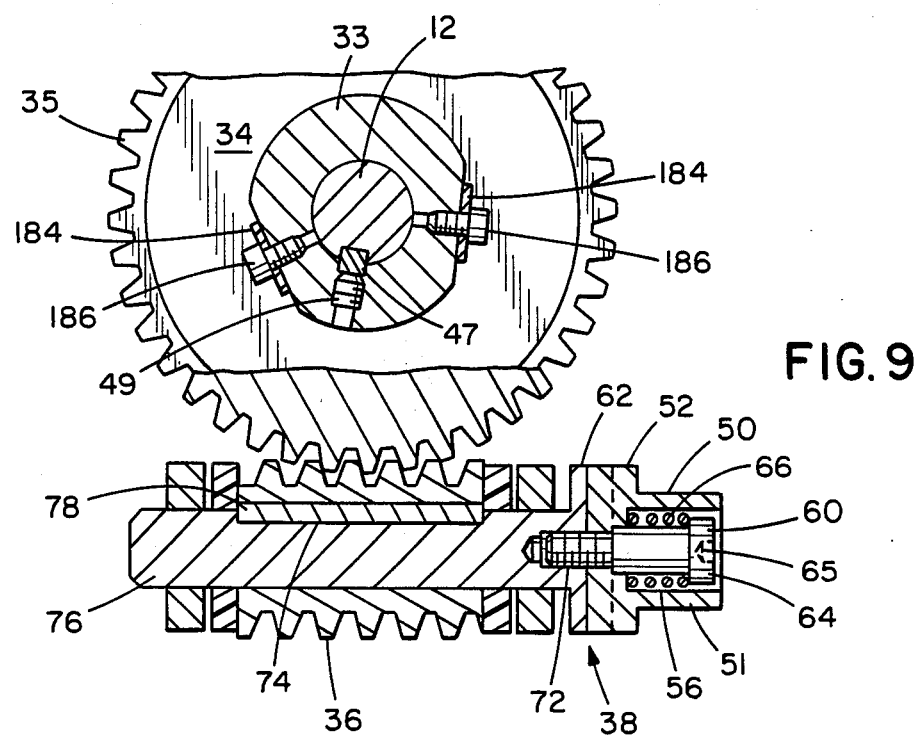
FIG. 9 is a sectional view showing the worm and gear assembly of the instant invention.
Figure 10:
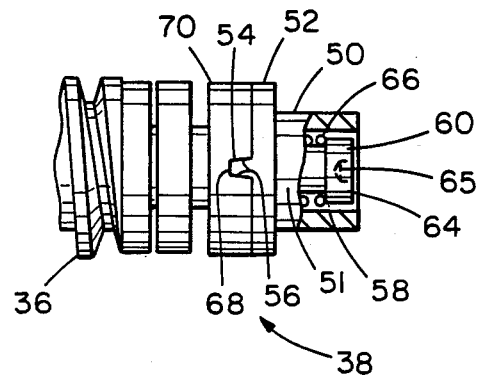
FIG. 10 is a partial side view and sectional view showing the slip clutch feature incorporated in the worm and gear assembly.

As best shown in FIGS. 9 and 10 of the Drawings, the driver shaft assembly includes a head 50 which has a hexnut top portion 51 with an integral collar portion 52 that is provided with a ridge 54 along its bottom surface. The base of the ridge adjacent the collar is wider than the top of extending portion of the ridge, i.e., the side walls 56 of the ridge converge at approximately 10° toward each other in the direction away from the hexnut portion. An aperture 58 extends centrally through the head of the driver shaft assembly including the hexnut, the collar and the ridge. A shoulder screw 60 having a hex recess extends through the aperture and is threadingly received within the driver shaft 62. The shoulder screw includes a head portion 64 with a hexagonal recess 65. The head portion 64 retains a spring 66 biasing the head 50 toward the driver shaft 62 of this assembly. A corresponding channel 68 is provided in the head 70 of the driver shaft 62 which is shaped and dimensioned to have a corresponding pitch of approximately 10° to receive the ridge 54. The driver shaft is provided with a threaded screw receiving recess 72 which is aligned with aperture 58 of the head. A screw locking material such as LOCTITE #TL-290 is applied to the screw threads to lock the screw within the driver shaft. A keyhold or groove 74 is provided in the body portion 76 of the driver shaft which as shown in FIG. 9 receives a key portion 78 of the worm. A suitable grease such as BEL-RAY #64982 is provided between the nut and driver shaft at the point where the ridge 54 meets the channel 68. The nut is designed to slip within a torque range of approximately 10-20 foot pounds when it is turned either clockwise or counterclockwise. The hexagonal recess 65 is then filled with a silicone rubber material, such as RTV732 silicone rubber manufactured by Dow Corning to discourage the application of torque to the shoulder screw which is locked within the driver shaft.

Figure 2:
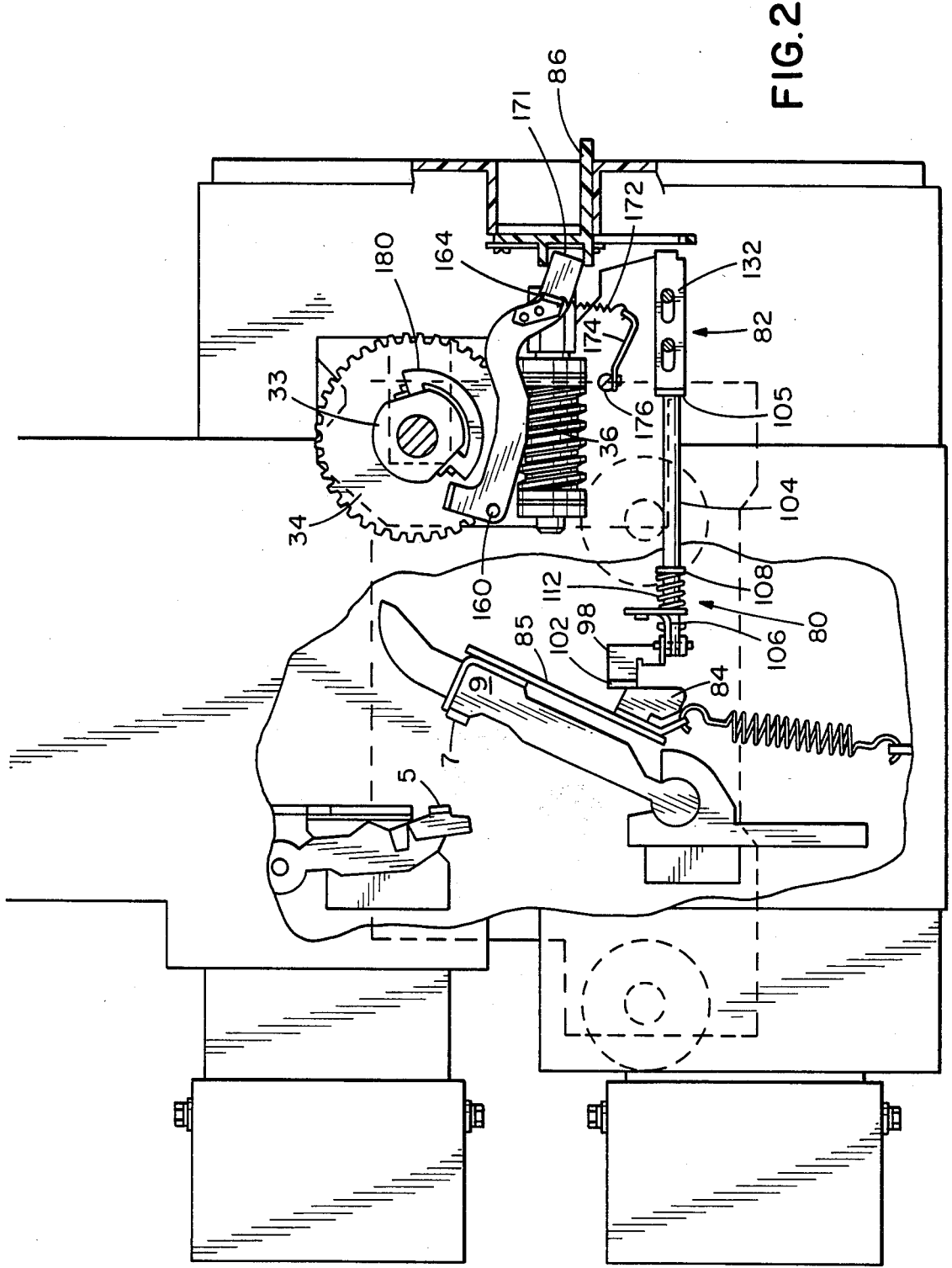
FIG. 2 is a side view along line 2—2 in FIG. 1 showing the interlock features of the present invention with the contact blades of the circuit breaker in the open position and the access door closed.
Figure 3:
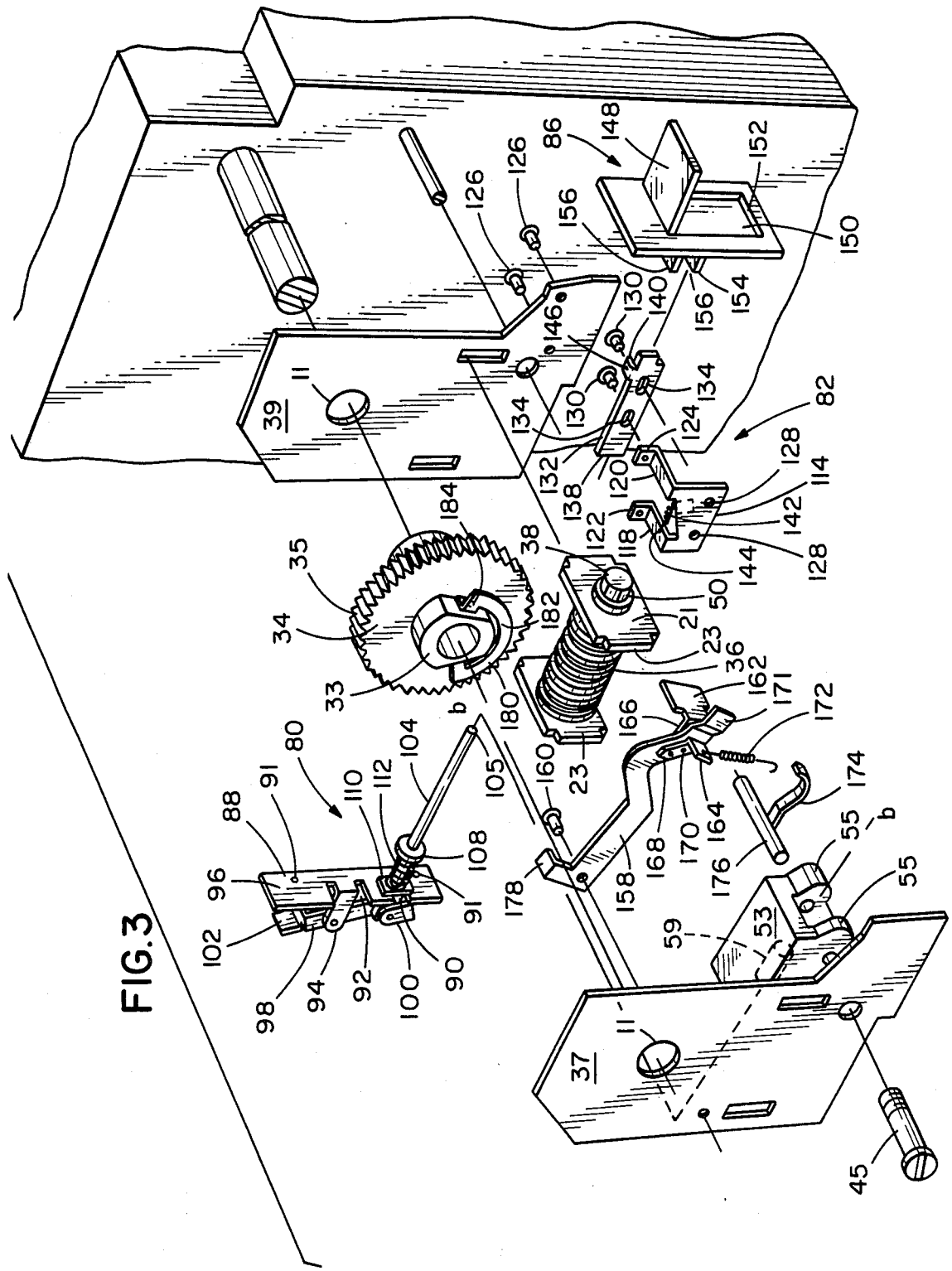
FIG. 3 is an exploded perspective view showing the interlock assembly.

As previously mentioned, it is desirable to prevent operation of the drawout mechanism in the event the circuit breaker is closed. Accordingly, as seen from FIGS. 2, 3, 6, 7 and 8 a plunger assembly 80 and a slider assembly 82 are controlled by a plunger actuator 84 that is fixed to the blade carrier 85. The blade carrier which is described in the previously referenced application and shown in FIGS. 2, 6 and 7 causes actuation of the plunger assembly which controls the slider assembly that is operably associated with an access door 86 carried by the auxiliary cover 42 and covering access opening 40 when the door is in its closed position. The plunger assembly includes a plunger pivot bracket 88 which is secured to cover 44 by screws 89 which pass through bracket holes 91. The bracket 88 is provided with a first recess 90 and a second recess 92 having an adjacent support ear 94 extending inward at approximately 90° to the main face 96 of the bracket. The support ear 94 pivotally retains a generally L-shaped plunger lever 98 which includes a generally U-shaped bent portion 100 at one end and an actuating tab 102 extending from the other end of the plunger lever in generally parallel relationship with the face of the bracket and extending from the side of the plunger lever away from the bracket. A plunger 104 is pivotally connected at one end within the U-shaped portion of the plunger lever and extends through the first recess 90 of the bracket. A first plunger collar 106 is provided on the plunger intermediate the bracket surface and the plunger lever while a second plunger collar 108 is provided on the plunger on the opposite side of the bracket and spaced away from the bracket a predetermined distance. The plunger may extend through a spring guard 110 which captures a spring 112 between itself and the second plunger collar with the spring guard being urged against the face of the plunger bracket on the side of the bracket opposite the first plunger collar. The free end 105 of the plunger is in contact with the slider assembly.

Figure 7:
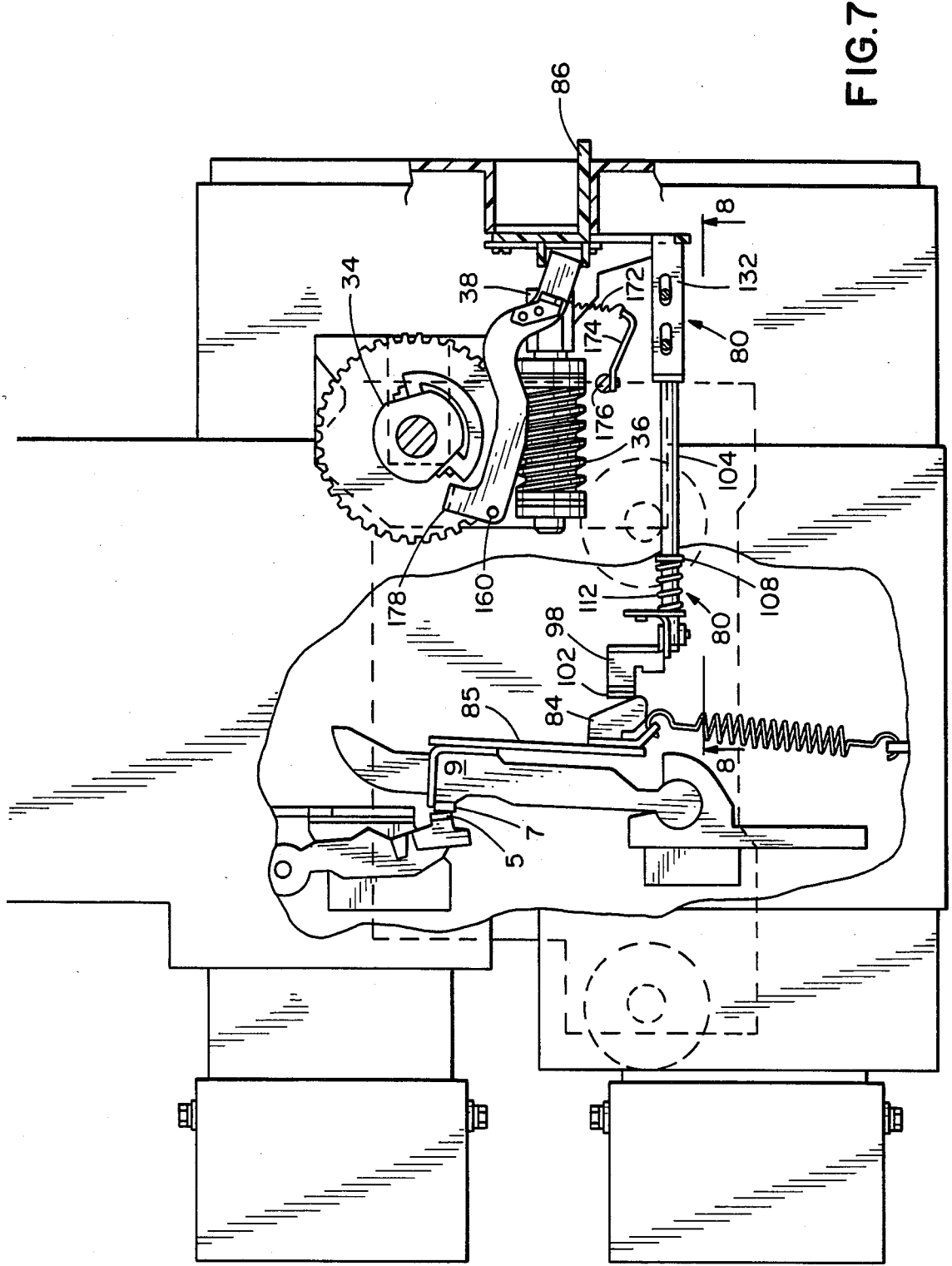
FIG. 7 is a side view as shown in FIG. 2 with the contact blades in the closed position and access door restrained closed.
Figure 8:
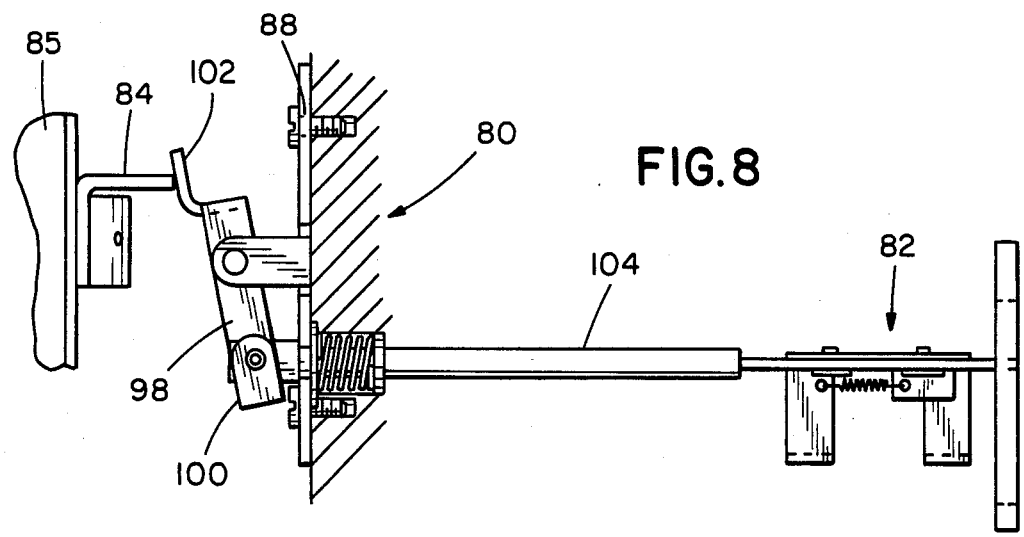
FIG. 8 is a side view taken along lines 8—8 of FIG. 7 showing the plunger and slider portions of the interlock assembly.

The slider assembly 82 includes a mounting bracket 114 having a main surface 116 and a pair of mounting legs 118 and 120 in generally parallel planes, each leg having a respective mounting tab 122 and 124 which is secured to the brace plate 39 by fasteners 126. The main surface of the bracket is provided with a pair of apertures 128 through which a pair of shoulder rivets 130 extend to support the slider 132 which is a rectangular member having a pair of oblong openings 134 which are in registration with the apertures 128 on the main surface of the mounting bracket. The slider includes a stop tab 136 at one end with the opposite end 138 positioned to be engaged by the free end 105 of the plunger. The sliders is also provided with a tang 140 extending outward from the amin surface of the bracket adjacent the stop tab toward the brace plate 39 to which the slider assembly is connected. A spring 142 is connected at one end through a hole 144 in leg 118 and at an opposite end through a hole 146 in the tang 140. Spring 142 biases the slider toward the plunger 104. When the contacts are opened the actuator 84 operates the plunger assembly to compress spring 112 with slider 132 following the plunger under the bias of spring 142. When the contacts are closed, spring 112 returns the plunger to a lock position which expands spring 142 moving the slider to a lock position wherein stop tab 36 restrains the access door in a closed position as shown in FIG. 7 and hereinafter further described.

The molded access door 86 is provided with a handle portion 148 and a window 150 through which a crank can be inserted to operate the draw-out mechanism. The window has a bottom ledge 152 which is engaged by the lower portion of stop tab 136 when the slider is moved to the lock position corresponding to a contact closed position of the circuit breaker contacts. A pair of molded stabs 154 form a channel 156 between them which relates to the trip interlock feature more fully addressed below.

It is also desirable to prevent closing the circuit breaker while the circuit breaker is only partially connected to the power bus. This is accomplished by maintaining the circuit breaker in a tripped position while the circuit breaker is between its "test" and "connected" positions. A trip arm 158 is pivotally supported adjacent one end by a shoulder rivet 160 connected to the brace plate 37. The oppposite end of the trip arm carries a shield 162 on one side and a spring retainer 164 on the other side. Both the shield and retainer have respective leg portion 166 and 168 which may be fastened together on opposite sides of the trip arm by rivets 170. The shield covers the head 50 of the driver shaft assembly 38 and requires that the trip arm be raised prior to operating the driver shaft assembly in the event the auxiliary cover is removed. Damage can thereby be avoided to the cam and cam follower. A slightly offset extending portion 171 is received within the channel 156 provided on the back side of the door 86. A spring 172 is connected at one end to the retainer 164 and at the opposite end to a trip lever 174 which is connected to a trip shaft 176 that is an extension of the trip shaft shown and described in the previous referenced application. The trip arm includes a cam follower portion 178 at its opposite end adjacent the point of pivotal connection to the brace plate 37. The cam follower portion is guided by a cam 180 which includes a semicircular cam surface 182 having mounting tabs 184 at each end which are connected by screws 186 to the hub 33 of worm gear 34 and extends a predetermined distance to maintain the breaker in the tripped position and the access door in its open position while the circuit breaker is between its "test" and connected positions.

While the invention has particularly been shown and described with reference to a preferred embodiment, it will be understood by those skilled in the art that variations and form, construction and arrangements may be made therein without departing from the spirit and scope of the invention. All such variations are intended to be covered in the appended claims.

We claim:

1. An interlock assembly for a draw-out circuit breaker having a casing with a front cover and at least one set of contacts carried within said casing, at least one of said contacts carried by a contact carrier movable between a first position in which said contacts are open and a second position in which said contacts are closed, said cirucit breaker including a draw-out mechanism that includes a worm gear carried on a driven shaft which extends between a pair of opposite side plates and carries a drive arm assembly at each end, said worm gear driven by a worm operably associated with said worm gear, said front cover carrying a slidably mounted door having a ledge, said door movable between a first door position providing access to said worm through said front cover and a second door position preventing access to said worm through said front cover, said assembly comprising:
   a brace assembly including a first brace plate and a second brace plate fastened to said casing, each brace plate having an opening receiving said driver shaft, said worm gear carried on said shaft intermediate said brace plate and said second brace plate,
   a slider assembly connected to said brace assembly and including a slider having a stop tab, said slider movable bewtwen a first slider position in which said stop tab is positioned adjacent said ledge preventing movement of said door from said second door position to said first door position and a second slider position in which said stop tab is spaced from said ledge permitting movement of said door from said second door position to said first door position, and a spring biasing the slider towards said second position;
   a plunger assembly operably associated with said slider assembly including a plunger movable between a first position and a second position, a spring biasing said plunger towards said first position wherein said plunger holds said slider in said first slider position; and
   a plunger actuator carried by said contact carrier, said plunger actuator operatively associated with said plunger assembly to move said plunger from said first position to said second position in response to said contact carrier moving from said second position to said first position to release said slider enabling said slider to move to said second slider position.

2. An interlock assembly as claimed in claim 1 wherein said plunger assembly comprises a pivot bracket secured to said casing, said pivot bracket including a support ear, a plunger lever having one end and an opposite end, said plunger lever pivotally connected intermediate saidone end and said opposite end to said support ear, said plunger lever including an actuating tab at said one end and said plunger connected to said opposite end.

3. An interlock assembly as claimed in claim 2 wherein said plunger includes a first collar portion on one side of said bracket and a second collar portion on the opposite side of said bracket, and said spring retained between said second collar and said bracket.

4. An interlock assembly as claimed in claim 1 wherein said slider assembly comprises a mounting bracket having a mains urface depending from a pair of generally parallel mounting legs, said legs each having a mounting tab secured against said second brace plate, said slider including an oblong recess, a shoulder rivet extending through said recess and movably connecting said slider to said main surface of said mounting bracket, said slider further including a tang, a spring connected at a first end to one of said leg portions and at an opposite end to said tang, said spring biasing said slider toward said second position.

5. An interlock assembly for a drawout circuit breaker having a casing with a front cover and at least one set of contacts carried within said casing, at least one of said contacts carried by a contact carrier movable between a first position in which said contacts are open and a second position in which said contacts are closed, said circuit breaker including a trip shaft for effecting trip operation of the circuit breaker and a drawout mechanism that includes a worm gear carried on a driven shaft for rotating said shaft about its longitudinal axis in response to rotation of said worm gear, said driven shaft carrying a drive arm assembly at each end, said worm gear driven by a worm operably associated with said womr gear, said front cover carrying a slidably mounted door movable between a first door position providing access to said worm through said front cover and a second door position preventing access to said worm through said front cover, said assembly comprising:

a brace assembly inclduing a first brace plate and a second brace plate fastened to said casing,e ach brace plate having an opening receiving said driven shaft, said worm gear carried on said shaft intermediate said first brace plate and said second brace plate, said door including a handle facing exterior to the circuit breaker and a pair of stabs directed interior to the circuit breaker, said pair of stabs forming a channel therebetween;

a trip arm pivotally connected at a pivot point to said brace assembly, said trip arm having an extending portion at one end received within said channel and a cam follower portion at said other end, said trip arm rotatable about said pivot point between a first arm position corresponding to movement of said door to said first door position and a second arm position corresponding to movement of said door to said second door position;

cam means carried by said worm gear for preventing movement of said trip from said first arm position to said second arm position in response to rotation of said womr gear through a predetermined distance; and connecting means for connecting said trip arm to said trip shaft to effect trip operation of the circuit breaker in response to said trip arm moving from said second arm position to said first arm position.

* * * * *